United States Patent
Sailer et al.

(10) Patent No.: US 6,286,968 B1
(45) Date of Patent: *Sep. 11, 2001

(54) MIRROR MOUNTING ASSEMBLY WITH STOP FEATURE

(75) Inventors: Kenneth D. Sailer, Columbia; Benjamin D. Kidd, Blythewood, both of SC (US)

(73) Assignee: Lang-Mekra North America, LLC, Ridgeway, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,732

(22) Filed: Sep. 7, 1999

(51) Int. Cl.⁷ .................................................. G02B 7/182
(52) U.S. Cl. ............................ 359/872; 248/478; 403/97
(58) Field of Search ............................. 359/841, 871, 359/872, 875; 248/477, 478; 403/92, 93, 95, 96, 97, 101

(56) References Cited

U.S. PATENT DOCUMENTS

| | | | |
|---|---|---|---|
| D. 385,243 | * 10/1997 | Lang | D12/188 |
| D. 387,317 | * 12/1997 | Lang | D12/187 |
| D. 407,361 | * 3/1999 | Lang | D12/187 |
| 3,119,591 | 1/1964 | Malecki . | |
| 3,339,876 | 9/1967 | Kampa . | |
| 3,346,229 | * 10/1967 | Carson | 248/477 |
| 3,384,334 | 5/1968 | Malachowski . | |
| 3,476,464 | 11/1969 | Clark . | |
| 3,637,186 | 1/1972 | Greenfield . | |
| 3,648,483 | 3/1972 | Garcia, Jr. . | |
| 3,784,149 | * 1/1974 | Brudy | 248/478 |
| 4,186,905 | * 2/1980 | Brudy | 248/478 |
| 4,348,556 | 9/1982 | Gettig et al. . | |
| 4,623,115 | * 11/1986 | Brester | 248/479 |
| 4,789,232 | 12/1988 | Urbanek . | |
| 4,824,065 | 4/1989 | Manzoni . | |
| 4,829,633 | 5/1989 | Kassner . | |
| 4,880,407 | 11/1989 | Carton-Bacon . | |
| 4,896,859 | 1/1990 | Polzer et al. . | |
| 4,991,950 | * 2/1991 | Lang et al. | 359/877 |
| 5,022,748 | 6/1991 | Espirito Santo . | |
| 5,044,596 | 9/1991 | do Espirito Santo . | |
| 5,081,546 | * 1/1992 | Bottrill | 359/841 |
| 5,092,440 | 3/1992 | Nakano . | |
| 5,098,058 | 3/1992 | Polzer et al. . | |
| 5,110,196 | * 5/1992 | Lang et al. | 359/874 |
| 5,120,015 | 6/1992 | do Espirito Santo . | |
| 5,137,247 | 8/1992 | Lang et al. . | |
| 5,143,468 | 9/1992 | Pausch . | |
| 5,432,640 | 7/1995 | Gilbert et al. . | |
| 5,625,502 | 4/1997 | Hoogenboom et al. . | |
| 5,684,646 | 11/1997 | Boddy . | |
| 5,687,035 | * 11/1997 | Lang | 359/864 |
| 5,722,629 | 3/1998 | Lang et al. . | |
| 5,798,882 | * 8/1998 | Lang | 359/872 |
| 5,844,733 | 12/1998 | Ravanini . | |
| 6,092,778 | 7/2000 | Lang et al. . | |

* cited by examiner

Primary Examiner—Cassandra Spyrou
Assistant Examiner—Mark A. Robinson
(74) Attorney, Agent, or Firm—Dority & Manning, P.A.

(57) ABSTRACT

A mirror mounting assembly for attaching a mirror mounting bar to a vehicle includes a bracket for attachment to the vehicle and a connector for attachment to the mounting bar. A first detent piece is non-rotatably mounted to the bracket and includes a contact surface defining alternating radial grooves and ridges, the first detent piece also including at least one shoulder. A second detent piece is non-rotatably mounted to the connector and includes a contact surface defining alternating radial grooves and ridges, the contact surface of the second detent piece contacting the contact surface of the first detent piece, the grooves and ridges of each of the first and second detent pieces matingly engageable with the ridges and grooves of the other of the first and second detent pieces in at least two orientations, the second detent piece also including at least one stop for contacting the shoulder of the first detent piece to preclude relative rotational movement between the first detent piece and the second detent piece in a given rotational direction. A spring-loaded axle extends through the bracket, the connector, the first detent piece, and the second detent piece for urging together the first detent piece and the second detent piece.

20 Claims, 4 Drawing Sheets

MIRROR MOUNTING ASSEMBLY WITH STOP FEATURE

BACKGROUND OF THE INVENTION

The present invention generally relates to vehicle mirror mounting assemblies, and more particularly relates to mirror mounting assemblies with a stop feature that allows a mirror mounting bar to be moved only a predetermined amount relative to the vehicle.

Many different arrangements are known for mounting external mirrors on vehicles. On large, commercial vehicles, such as trucks and busses, mirrors are often secured within mirror housings mounted so as to extend the mirror out from the vehicle thereby providing a clear view of different areas around the vehicle. Depending on the size and design of the mirror, as well as the area around the vehicle to be observed, different mounting arrangements have been used.

One such type of mounting arrangement includes a bar extending outwardly from the vehicle, often in substantially a U-shape, in which the ends of the U-bar are attached to the side of the vehicle. Alternately, a bar may be attached to the vehicle at only one end, with a mirror housing being disposed at a distal end or central portion, or both, of such bar. In either of such applications, one mounting bar is typically attached to each side of the driver's cab of a truck for placement of at least one mirror housing. These one-piece mounting bar arrangements are often referred to in the industry as "C-loops," to differentiate them from other available types of mounting arrangements made of several interconnected, generally smaller diameter rods that are secured together, often by nuts and bolts. Some one-piece mounting bar arrangements do, however, include additional bracing members for additional support in certain applications. Examples of mirrors mounted on one-piece mounting bars are shown in U.S. Pat. Nos. 4,991,950; 5,110,196; 5,687,035; and 5,798,882 and in U.S. Design Pat. Nos. 385,243; 387,317; and 407,361.

Mirror housings may be attached to the central (upright when installed) portions of the U-bars or to the extending bars in various ways. For example, the bar may pass through the center of the mirror housing, with a clamping mechanism of some type disposed within the housing securing the mirror housing to the bar (see U.S. Pat. No. 5,687,035). Alternately, a mounting mechanism may extend from the mirror housing and be secured to the bar externally of the mirror housing (see U.S. Pat. No. 4,991,950). Both of these methods of attachment provide reliable securing of the mirror housing to the bar.

One-piece mounting bar arrangements generally provide a reliable, vibration-reducing, and sturdy mounting arrangement for mirrors. Also, one-piece mounting bar arrangements beneficially do not require assembly of several smaller rods during manufacture, installation, or repair. Also, one-piece bars favorably provide a visually streamlined styling that many people prefer on vehicles, as compared to the multi-rod designs.

One-piece mounting bars have been made that are pivotable into or out of position. Pivotable mounting bars are useful in that they provide versatility and adjustability in mounting mirrors on vehicles. Such mounting bars also beneficially allow mirrors to be moved out of their operating positions for parking in tight spots, washing, etc., or in case a driver were to inadvertently collide the mirror with an object.

Although it is desirable to have mirror mounting bars be pivotable to some extent, pivotable mounting bars could potentially be pivoted too far from their desired position, possibly causing the mirror housing to be damaged, or causing damage to the vehicle or mounting hardware. For example, if a driver were to drive too close to an object adjacent the vehicle, the mounting bar could be pivoted so that the mirror housing and/or bar would impact the vehicle.

OBJECTIVES AND SUMMARY OF THE INVENTION

In view of the above, it is a principle objective of the present invention to provide an efficient and simplified vehicle mirror mounting assembly to allow for reliable and efficient manufacture and assembly of vehicle mirror assemblies, and to allow for safe and reliable use of vehicle mirrors.

Other objectives and advantages of the invention will be made clear from the written description and claims that follow, taken in conjunction with the appended drawings, or may be learned from practice of the invention.

To achieve these objectives, and in accordance with the purposes of the invention, as embodied and broadly described and depicted herein, a mirror mounting assembly for attaching a mirror mounting bar to a vehicle, the mirror mounting assembly comprising a bracket for attachment to the vehicle; a connector for attachment to the mounting bar; a first detent piece non-rotatably mounted to the bracket and including a contact surface defining alternating radial grooves and ridges, the first detent piece also including at least one shoulder; a second detent piece non-rotatably mounted to the connector and including a contact surface defining alternating radial grooves and ridges, the contact surface of the second detent piece contacting the contact surface of the first detent piece, the grooves and ridges of each of the first and second detent pieces matingly engageable with the ridges and grooves of the other of the first and second detent pieces in at least two orientations, the second detent piece also including at least one stop for contacting the shoulder of the first detent piece to preclude relative rotational movement between the first detent piece and the second detent piece in a given rotational direction; and a spring-loaded axle extending through the bracket, the connector, the first detent piece, and the second detent piece for urging together the first detent piece and the second detent piece.

Preferably, the first detent piece and the second detent piece each include six radially extending grooves and six radially extending ridges. Also, the first detent piece preferably further includes a second shoulder and the second detent piece further includes a second stop for contacting the second shoulder to preclude relative rotational movement between the first detent piece and the second detent piece in the rotational direction opposite the given rotational direction.

The bracket preferably defines a recess for receiving the first detent piece, the recess including an indentation, the first detent piece including a protrusion disposed within the indentation to preclude rotation of the first detent piece relative to the bracket. The connector preferably defines a recess for receiving the second detent piece, the recess including an indentation, the second detent piece including a protrusion disposed within the indentation to preclude rotation of the second detent piece relative to the connector.

The shoulder may be formed integral with the first detent piece and the stop is formed integral with the second detent piece.

Optionally, the first detent piece may be formed integral with the bracket and the second detent piece is formed integral with the connector.

BRIEF DESCRIPTIONS OF THE DRAWINGS

The present invention will be more fully understood from the following detailed description, taken in conjunction with the accompanying drawings, wherein like reference numerals refer to like parts, and in which.

DETAILED DESCRIPTION OF THE PREFERRED EMBODIMENT

Figure 1:
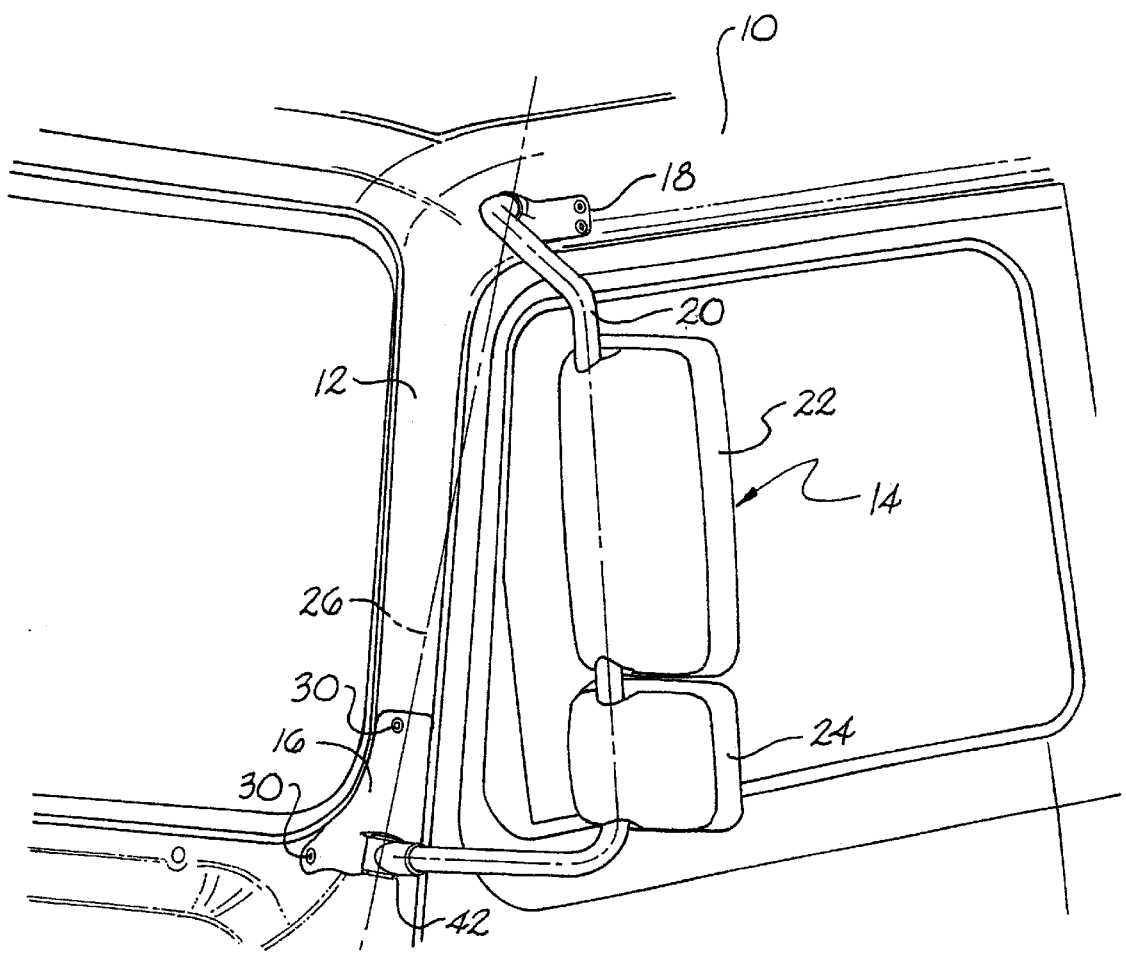
FIG. 1 is perspective view of a mirror mounting assembly according to the present invention, as used on a vehicle.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment or figure can be used on another embodiment or figure to yield yet another embodiment. It is intended that the present invention include such modifications and variations.

One exemplary example of a mirror mounting assembly with stop feature made according to the present invention is broadly embodied in FIGS. 1–5. As generally shown in FIG. 1, vehicle 10 includes an A-column 12 on which a rear view mirror assembly 14 is mounted. Rear view mirror assembly 14 includes a lower mounting bracket 16, an upper mounting bracket 18, a mounting bar 20, and mirror housings 22 and 24. It is to be understood that any sort of mounting bar or mirror housings may be utilized according to the present invention. As will be described in more detail below, mounting bar 20 is pivotable about axis 26 via brackets 16 and 18.

Figure 3:
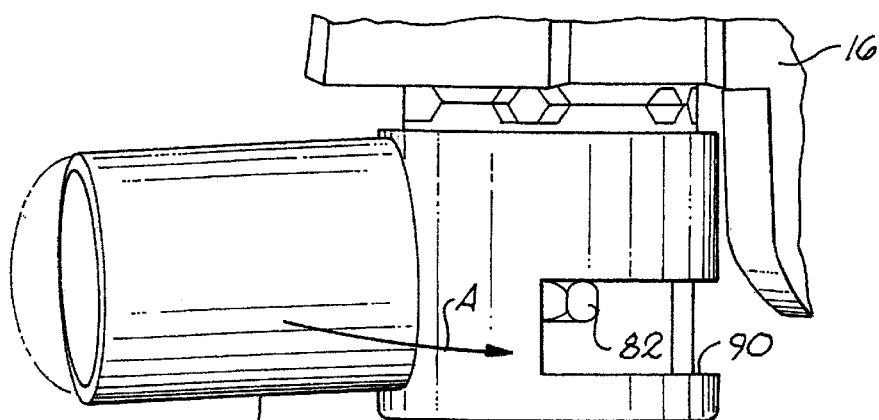
FIG. 3 is a plan view of a portion of the mirror mounting assembly as shown in FIG. 2, with the mounting bar rotated.
Figure 4:
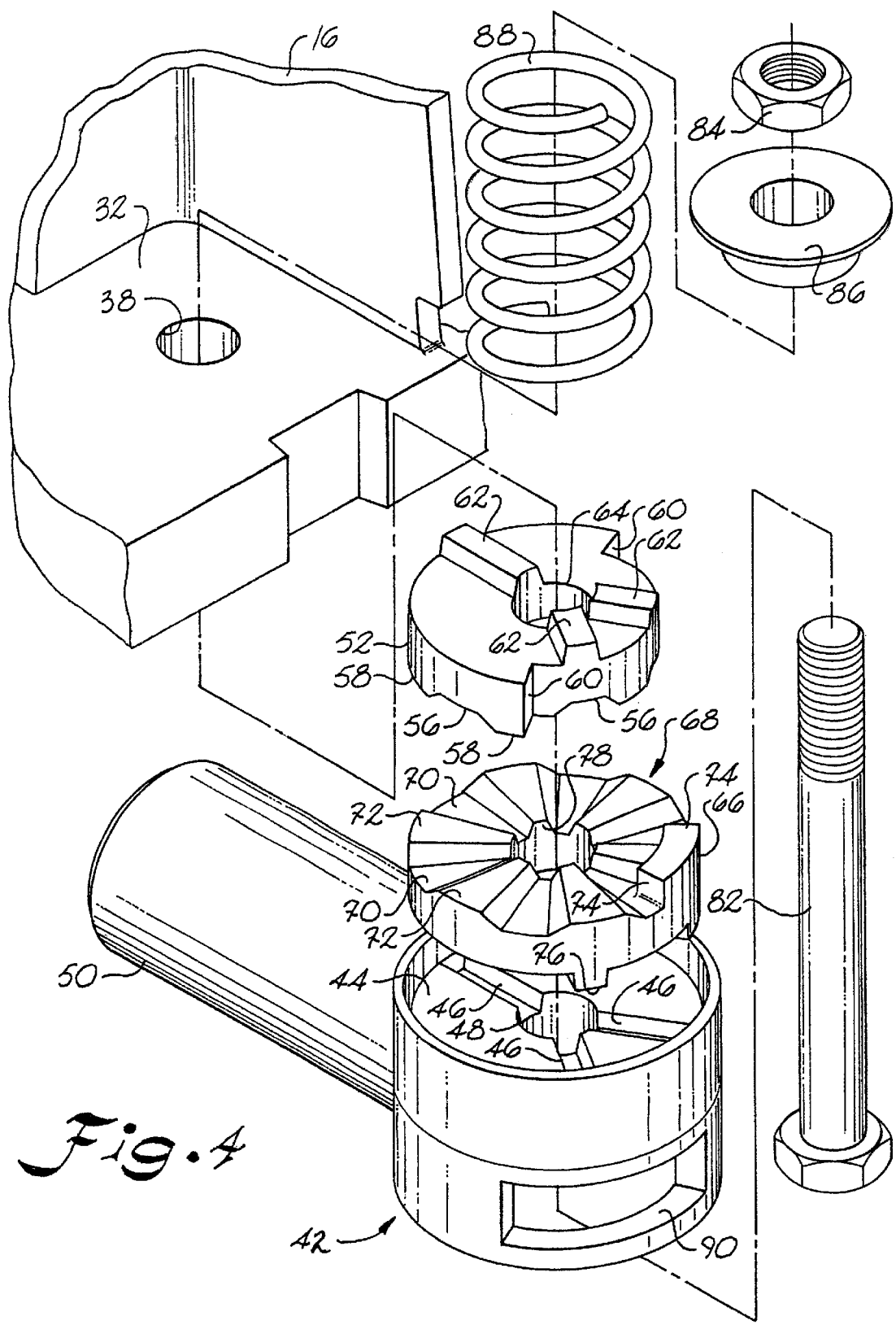
FIG. 4 is a top exploded perspective view of the mirror mounting assembly of FIG. 2.
Figure 5:
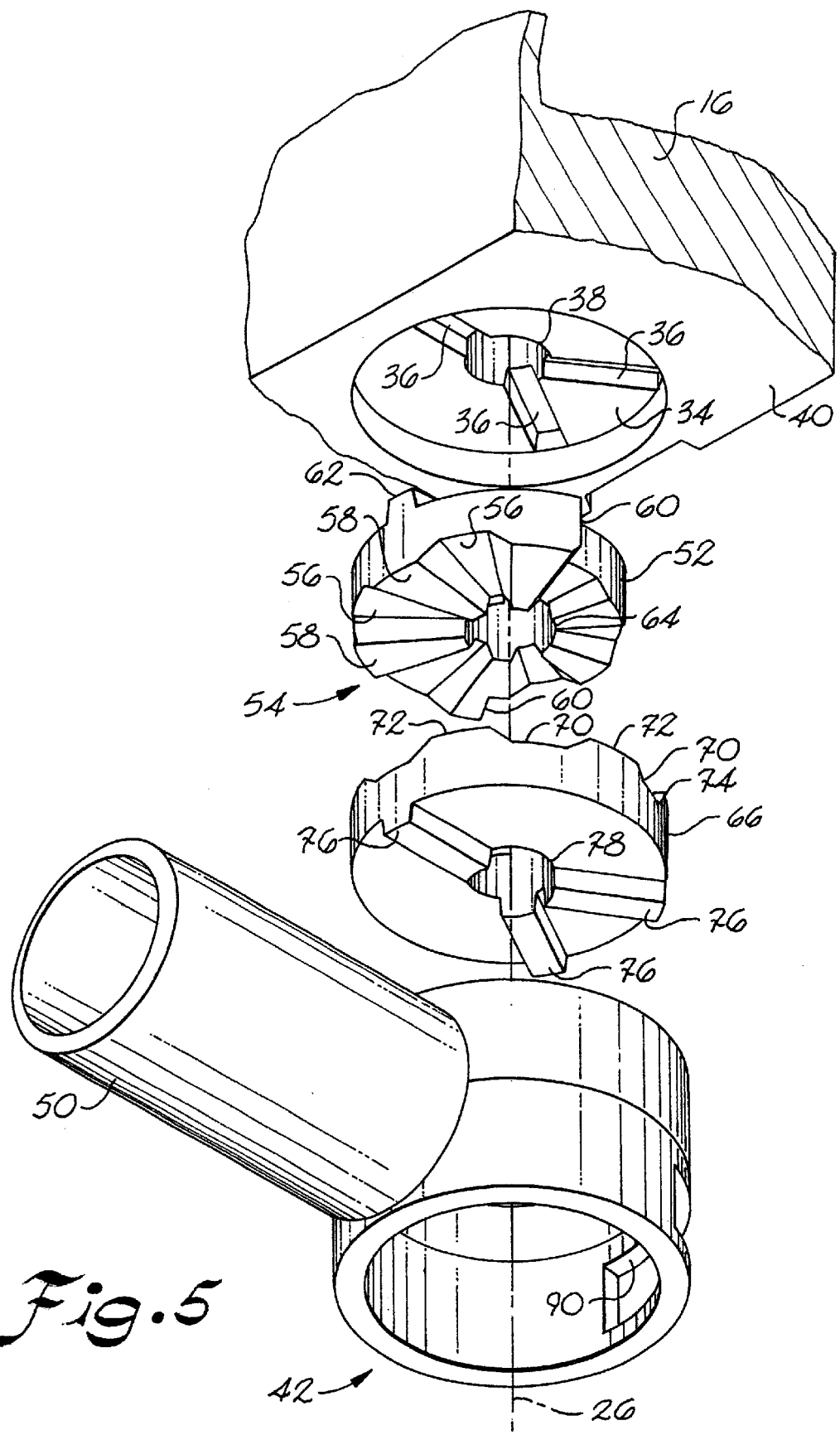
FIG. 5 is a bottom exploded perspective view of some of the components shown in FIG. 4.

Mounting bracket 16 and related parts are shown in greater detail in FIGS. 2–5. As shown therein, bracket 16 includes three openings 28 for receiving bolts 30 (See FIG. 1) for securing bracket 16 to vehicle 10. Bracket 16 further defines a cavity 32 therein in which other parts are disposed. As shown in FIG. 5, bracket 16 also defines a recess 34 into which indentations 36 are further defined. An opening 38 extends through center of recess 34 communicating cavity 32 with the bottom surface 40 of bracket 16.

A connector 42 is provided for attachment to mounting bar 20. As shown in FIG. 4, connector 42 defines a recess 44 further defining indentations 46 therein, and an opening 48 extends through connector 42 in the center of recess 44. Mounting bar 20 is received within a tube portion 50 of connector 42.

As shown best in FIGS. 4 and 5, a first detent piece 52 is non-rotatably mounted to bracket 16 and includes a contact surface 54 defining alternating radial grooves 56 and ridges 58. As shown, first detent piece 52 also includes two shoulders 60 and three protrusions 62 opposite contact surface 54. An opening 64 extends through the center of first detent piece 52.

As shown in FIG. 4, a second detent piece 66 is non-rotatably mounted to connector 42 and includes a contact surface 68 defining alternating radial grooves 70 and ridges 72. Two stops 74 are also provided, each for contacting one shoulder 60 of first detent piece 52 to preclude relative rotational movement between first detent piece 52 and second detent piece 66 in a given rotational direction. Protrusions 76 are provided opposite grooves 70 and ridges 72, and an opening 78 is defined through the center of second detent piece 66.

Figure 2:
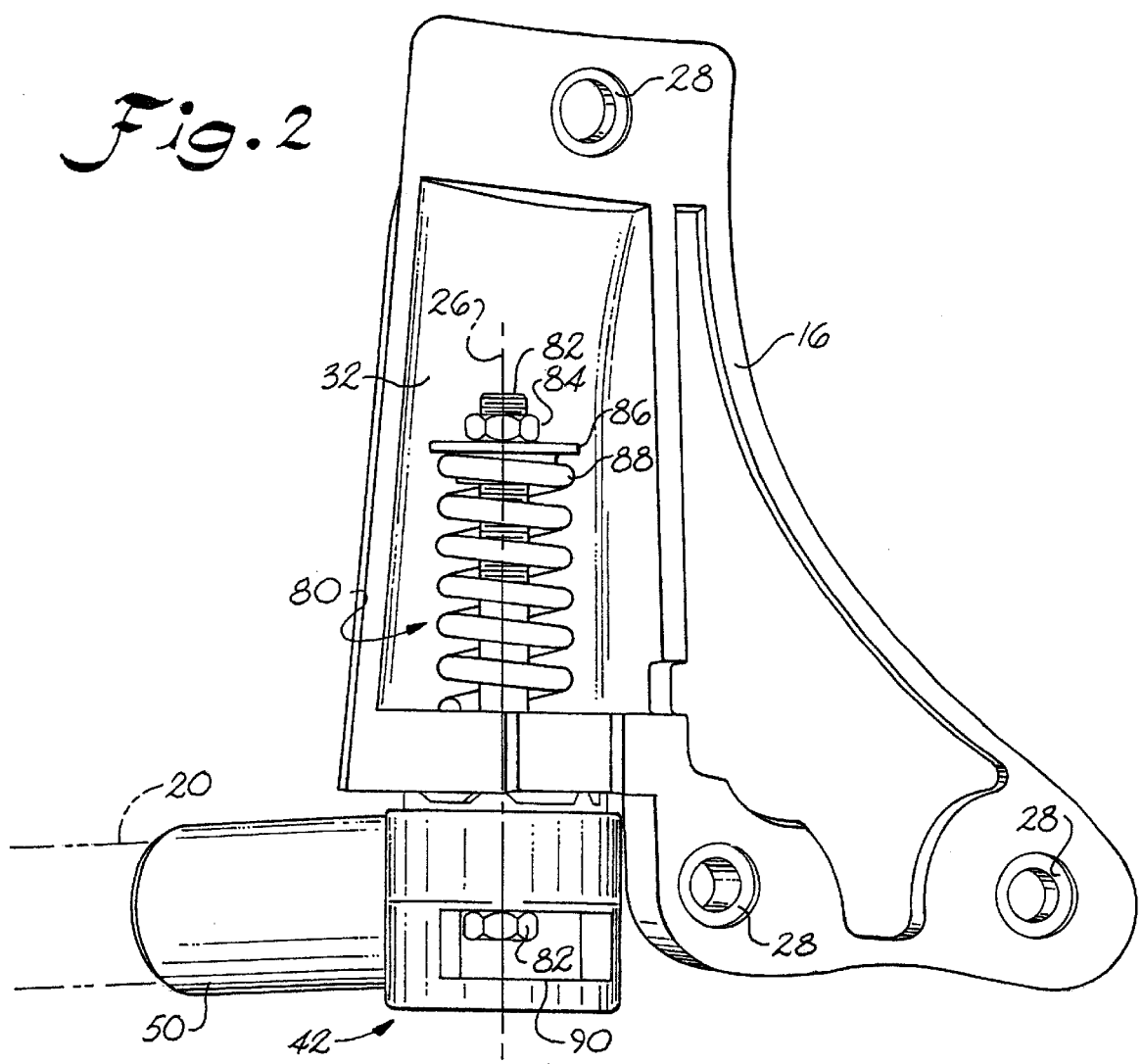
FIG. 2 is a plan view of a mirror mounting assembly according to the present invention.

A spring loaded axle, generally referred to as reference numeral 80, is provided extending through bracket 16, connector 42, first detent piece 52, and second detent piece 66 for urging together the first and second detent pieces. As depicted, spring loaded axle 80 includes a threaded bolt 82, a nut 84, a washer 86, and a compression spring 88. Threaded bolt 82 extends through opening 48 in connector 42, opening 78 in second detent piece 66, opening 64 in first detent piece 52, and opening 38 in bracket 16. Bolt 82 extends along axis 26. Nut 84, washer 86, and compression spring 88 are disposed, as best shown in FIG. 2, within bracket 16 so as to urge together first detent piece 52 and second detent piece 66. As shown best in FIG. 2, spring-loaded axle 80 may be assembled from the rear of bracket 16, and an opening 90 may be provided in connector 42 for access to the head of bolt 82.

Once assembled, protrusions 62 are seated in indentations 36, and protrusions 76 are seated in indentations 46. The radially extending nature of the indentations and protrusion firmly seat the detent pieces within the bracket and connector, thereby precluding relative rotation. The unequal angular spacing of protrusions 62 and 76 prevents inadvertent misassembly of the device.

As shown in FIGS. 4 and 5, first and second detent pieces 52 and 66 may preferably include six radially extending grooves and six radially extending ridges. The grooves and ridges on the detent pieces are correspondingly sized to be matingly engageable with each other so that they are positionable in multiple rotational orientations. Thus, the relative positioning of first detent piece 52 and second detent piece 66 is limited only by the location of stops 74 and shoulders 60. As shown in FIG. 4, three separate relative orientations are possible, each separated from adjacent orientations by 60°. Thus, if one stop 74 is contacting a respective shoulder 60, connector 42 (and accordingly mounting bar 20) may be rotated through a total of 120° until the other stop 74 contacts the other shoulder 60. It should be understood that the number of grooves and ridges, and the location of the stops and shoulders may be altered for particular mirror and vehicle applications, as desired.

Preferably, the ridges are slightly angularly wider (23°) than the grooves (19°) so that, when assembled, the tops of the ridges are spaced about 0.5 mm from the base of the opposing groove. This spacing allows for lubrication and continued function in case debris gets between the detent pieces.

As shown in FIG. 4, the side of protrusion 62 and 76 are much more axially extending (relative to axis 26), having an about 5° taper, than are the slanted areas between the tops of the ridges 72 and 58 and the bottoms of the grooves 70 and 56. Thus, under the influence of spring 88, if a rotational force is applied to bar 20, second detent piece 66 will rotate relative to first detent piece 52 before protrusions 76 or 62 are moved from their respective recesses. Thus, as shown in FIGS. 2 and 3, rotational force applied to bar 20 will cause the grooves and ridges in the detent pieces 52 and 56 to move from their mated position (shown in FIG. 2) to their unmated position (shown in FIG. 3). Assuming no interference from stop 74 and shoulder 60, further movement in the direction of arrow A in FIG. 3 will result in the grooves and ridges again becoming mated (in position shown in FIG. 2, but with connector rotated 60°).

Although first and second detent pieces 52 and 66 have been shown herein as parts formed separately from bracket 16 and connector 42, it would be possible to form the grooves and ridges integral with portions of bracket 16 and connector 42. Such is a matter of design choice, depending for example on the material chosen for bracket 16, connector 52, detent pieces 52 and 66, and the weight of bar 20 and mirror housings 22 and 24. Typically, detent pieces 52 and 66 are made of a hard powdered metal, and they could be seated within aluminum bracket 16 and connector 42 pieces. However, all pieces could be formed of metal such as aluminum, or all pieces could be formed of plastic such as nylon, if desired.

It will be apparent to those skilled in the art that various modifications and variations can be made in the present invention without departing from the scope and spirit of the invention. For example, the depicted shape of the grooves and ridges in the first and second detent pieces could be changed. Also, the locations of the shoulders and the stops could be switched from one detent piece to the other. It is intended that the present invention include such modifications and variations as come within the scope of the appended claims and their equivalents.

We claim:

1. A mirror mounting assembly for attaching a mirror mounting bar to a vehicle, the mirror mounting assembly comprising:
   a bracket for attachment to the vehicle;
   a connector for attachment to the mounting bar;
   a first detent piece non-rotatably mounted to the bracket and including a contact surface defining alternating radial grooves and ridges, the first detent piece also including at least one shoulder;
   a second detent piece non-rotatably mounted to the connector and including a contact surface defining alternating radial grooves and ridges, the contact surface of the second detent piece contacting the contact surface of the first detent piece, the grooves and ridges of each of the first and second detent pieces matingly engageable with the ridges and grooves of the other of the first and second detent pieces in at least two orientations, the second detent piece also including at least one stop for contacting the shoulder of the first detent piece to preclude relative rotational movement between the first detent piece and the second detent piece in a given rotational direction; and
   a spring-loaded axle extending through the bracket, the connector, the first detent piece, and the second detent piece for urging together the first detent piece and the second detent piece.

2. The mirror mounting assembly of claim 1, wherein the first detent piece and the second detent piece each include six radially extending grooves and six radially extending ridges.

3. The mirror mounting assembly of claim 1, wherein the first detent piece further includes a second shoulder and the second detent piece further includes a second stop for contacting the second shoulder to preclude relative rotational movement between the first detent piece and the second detent piece in the rotational direction opposite the given rotational direction.

4. The mirror mounting assembly of claim 3, wherein the first and second detent pieces are positionable in three matingly engaged orientations.

5. The mirror mounting assembly of claim 4, wherein the matingly engaged orientations span 120°.

6. The mirror mounting assembly of claim 1, wherein the bracket defines a recess for receiving the first detent piece, the recess including an indentation, the first detent piece including a protrusion disposed within the indentation to preclude rotation of the first detent piece relative to the bracket.

7. The mirror mounting assembly of claim 6, wherein the indentation and protrusion extend radially relative to the spring loaded axle.

8. The mirror mounting assembly of claim 6, wherein the recess includes three of the indentations and the first detent piece includes three of the protrusions.

9. The mirror mounting assembly of claim 1, wherein the connector defines a recess for receiving the second detent piece, the recess including an indentation, the second detent piece including a protrusion disposed within the indentation to preclude rotation of the second detent piece relative to the connector.

10. The mirror mounting assembly of claim 9, wherein the indentation and protrusion extend radially relative to the spring loaded axle.

11. The mirror mounting assembly of claim 9, wherein the recess includes three of the indentations and the first detent piece includes three of the protrusions.

12. The mirror mounting assembly of claim 1, wherein the spring loaded axle includes a threaded bolt, a nut, a washer, and a compression spring, the threaded bolt extending through the bracket, the first detent piece, the second detent piece, and the connector.

13. The mirror mounting assembly of claim 12, wherein the nut, the washer, and the compression spring are disposed in the bracket.

14. The mirror mounting assembly of claim 1, further including the mounting bar.

15. The mirror mounting assembly of claim 14, further including a mirror housing mounted on the mirror bar.

16. The mirror mounting assembly of claim 1, wherein the first detent piece and the second detent piece are substantially disk-shaped.

17. The mirror mounting assembly of claim 1, wherein the shoulder is formed integral with the first detent piece and the stop is formed integral with the second detent piece.

18. The mirror mounting assembly of claim 1, wherein the first detent piece is formed integral with the bracket and the second detent piece is formed integral with the connector.

19. The mirror mounting assembly of claim 1, wherein the bracket is disposed at the lower end of a U-shaped mounting bar.

20. The mirror mounting assembly of claim 1, wherein the shoulder and the stop are disposed at radially outer locations on respective first and second detent pieces.

* * * * *